United States Patent
Hosseini et al.

(10) Patent No.: US 11,523,358 B2
(45) Date of Patent: Dec. 6, 2022

(54) METHODS AND APPARATUS FOR TIMING ADVANCE IN NEW RADIO AND SIDELINK COMMUNICATIONS

(71) Applicant: QUALCOMM Incorporated, San Diego, CA (US)

(72) Inventors: Seyedkianoush Hosseini, San Diego, CA (US); Peter Gaal, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/083,956

(22) Filed: Oct. 29, 2020

(65) Prior Publication Data
US 2021/0136714 A1    May 6, 2021

Related U.S. Application Data

(60) Provisional application No. 62/929,590, filed on Nov. 1, 2019.

(51) Int. Cl.
| | |
|---|---|
| H04W 56/00 | (2009.01) |
| H04W 8/24 | (2009.01) |
| H04W 8/12 | (2009.01) |
| H04W 84/04 | (2009.01) |
| H04W 92/18 | (2009.01) |

(52) U.S. Cl.
CPC ......... *H04W 56/0045* (2013.01); *H04W 8/12* (2013.01); *H04W 8/24* (2013.01); *H04W 56/001* (2013.01); *H04W 84/042* (2013.01); *H04W 92/18* (2013.01)

(58) Field of Classification Search
CPC ..... H04W 56/0045; H04W 8/12; H04W 8/20; H04W 8/24; H04W 56/001; H04W 84/042; H04W 92/18
USPC ................ 370/329, 328, 338, 341, 345, 350
See application file for complete search history.

(56) References Cited

U.S. PATENT DOCUMENTS

| | | | | |
|---|---|---|---|---|
| 9,226,290 | B2 * | 12/2015 | Gaal ................. | H04W 56/0005 |
| 10,536,916 | B2 * | 1/2020 | Yoshizawa ............ | H04W 24/08 |
| 2014/0355574 | A1 | 12/2014 | Turtinen et al. | |
| 2017/0055223 | A1 * | 2/2017 | Shao ...................... | H04W 52/04 |

(Continued)

OTHER PUBLICATIONS

International Search Report and Written Opinion—PCT/US2020/058316—ISA/EPO—dated Feb. 24, 2021.

(Continued)

*Primary Examiner* — Nghi H Ly
(74) *Attorney, Agent, or Firm* — Danai Nelisile Mhembere; ArentFox Schiff LLP

(57) ABSTRACT

Aspects of the present disclosure include methods, apparatuses, and computer readable media for establishing a first communication link with a base station (BS), establishing a second communication link with a second UE, generating a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS, and transmitting the TAG capability report to the BS.

30 Claims, 9 Drawing Sheets

(56) References Cited

U.S. PATENT DOCUMENTS

2019/0159156 A1    5/2019  Abedini et al.

OTHER PUBLICATIONS

LG Electronics: "Further Discussion on the Multi-carrier Issues in D2D", 3GPP TSG RAN WG1 Meeting #78bis, R1-144030 Multi-Carrier_LG, 3rd Generation Partnership Project (3GPP), Mobile Competence Centre; 650, Route Des Lucioles; F-06921 Sophia-Antipolis Cedex; France, vol. RAN WG1, No. Ljubljana, Slovenia; Oct. 6, 2014-Oct. 10, 2014, (Oct. 5, 2014), pp. 1-4. Retrieved from the Internet: URL: http://www.3gpp.org/ftp/Meetings_3GPP_SYNC/RAN1/Docs/[retrieved on Oct. 5, 2014], paragraph[02. 3], paragraph[02. 4], Proposal 2.

* cited by examiner

METHODS AND APPARATUS FOR TIMING ADVANCE IN NEW RADIO AND SIDELINK COMMUNICATIONS

CROSS-REFERENCE TO RELATED APPLICATIONS

The current application claims priority to U.S. Provisional Application No. 62/929,590 entitled "METHODS AND APPARATUS FOR TIMING ADVANCE IN NEW RADIO AND SIDELINK COMMUNICATIONS," filed on Nov. 1, 2019, the contents of which are incorporated by reference in their entireties.

BACKGROUND

Aspects of the present disclosure relate generally to wireless communications, and more particularly, to timing advance for new radio and sidelink communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

During sidelink (SL) communications, for example, a user equipment (UE) may communicate with a base station (BS) via an uplink (UU) while communicating with another UE via a sidelink. The UE may simultaneously communicate with one or more BSs and/or one or more UEs. The distances between the UEs and the BSs may be different, and may follow different timing advance (TA) rules. However, it may be difficult for the UE to maintain proper timing synchronizations between the UU interface and the SL interface. Therefore, improvements in managing and reporting of TA values may be desired

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for establishing, by a first user equipment (UE), a first communication link with a base station (BS), establishing a second communication link with a second UE, generating a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS, and transmitting the TAG capability report to the BS.

Other aspects of the present disclosure include a first UE having a memory having instructions, a transceiver, and one or more processors operatively coupled with the memory and the transceiver, the one or more processors configured to execute the instructions to establish, by the first UE, a first communication link with a base station (BS), establish a second communication link with a second UE, generate a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS, and transmit the TAG capability report to the BS.

An aspect of the present disclosure includes a first UE including means for establishing, by the first UE, a first communication link with a base station (BS), means for establishing a second communication link with a second UE, means for generating a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS, and means for transmitting the TAG capability report to the BS.

Some aspects of the present disclosure include a non-transitory computer readable media having instructions stored therein that, when executed by one or more processors of a first UE, cause the one or more processors to establish, by a first UE, a first communication link with a base station (BS), establish a second communication link with a second UE, generate a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS, and transmit the TAG capability report to the BS.

Aspects of the present disclosure include a method by a base station (BS) for receiving a timing advance group (TAG) capability report comprising a plurality of link-specific TAG numbers supported by the UE from a first user equipment (UE), wherein a first TAG number of the plurality of link-specific TAG numbers is associated with the first communication link between the first UE and the BS and a second TAG number of the plurality of link-specific TAG numbers is associated with a second communication link between the first UE and a second UE and establishing one or more uplink communication channels, wherein a number of TAGs associated with the one or more uplink communication channels is less than or equal to the first TAG number.

Other aspects of the present disclosure include a base station (BS) having a memory having instructions, a transceiver, and one or more processors operatively coupled with the memory and the transceiver, the one or more processors configured to execute the instructions to receive a timing advance group (TAG) capability report comprising a plurality of link-specific TAG numbers supported by the UE from a first user equipment (UE), wherein a first TAG number of the plurality of link-specific TAG numbers is associated with the first communication link between the first UE and the BS and a second TAG number of the plurality of link-specific TAG numbers is associated with a second communication link between the first UE and a second UE and establish one or more uplink communication channels, wherein a number of TAGs associated with the one or more uplink communication channels is less than or equal to the first TAG number.

An aspect of the present disclosure includes a base station (BS) including means for receiving a timing advance group (TAG) capability report comprising a plurality of link-specific TAG numbers supported by the UE from a first user equipment (UE), wherein a first TAG number of the plurality of link-specific TAG numbers is associated with the first communication link between the first UE and the BS and a second TAG number of the plurality of link-specific TAG numbers is associated with a second communication link between the first UE and a second UE and means for establishing one or more uplink communication channels, wherein a number of TAGs associated with the one or more uplink communication channels is less than or equal to the first TAG number.

Some aspects of the present disclosure include a non-transitory computer readable media having instructions stored therein that, when executed by one or more processors of a base station (BS), cause the one or more processors to receive a timing advance group (TAG) capability report comprising a plurality of link-specific TAG numbers supported by the UE from a first user equipment (UE), wherein a first TAG number of the plurality of link-specific TAG numbers is associated with the first communication link between the first UE and the BS and a second TAG number of the plurality of link-specific TAG numbers is associated with a second communication link between the first UE and a second UE and establish one or more uplink communication channels, wherein a number of TAGs associated with the one or more uplink communication channels is less than or equal to the first TAG number.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
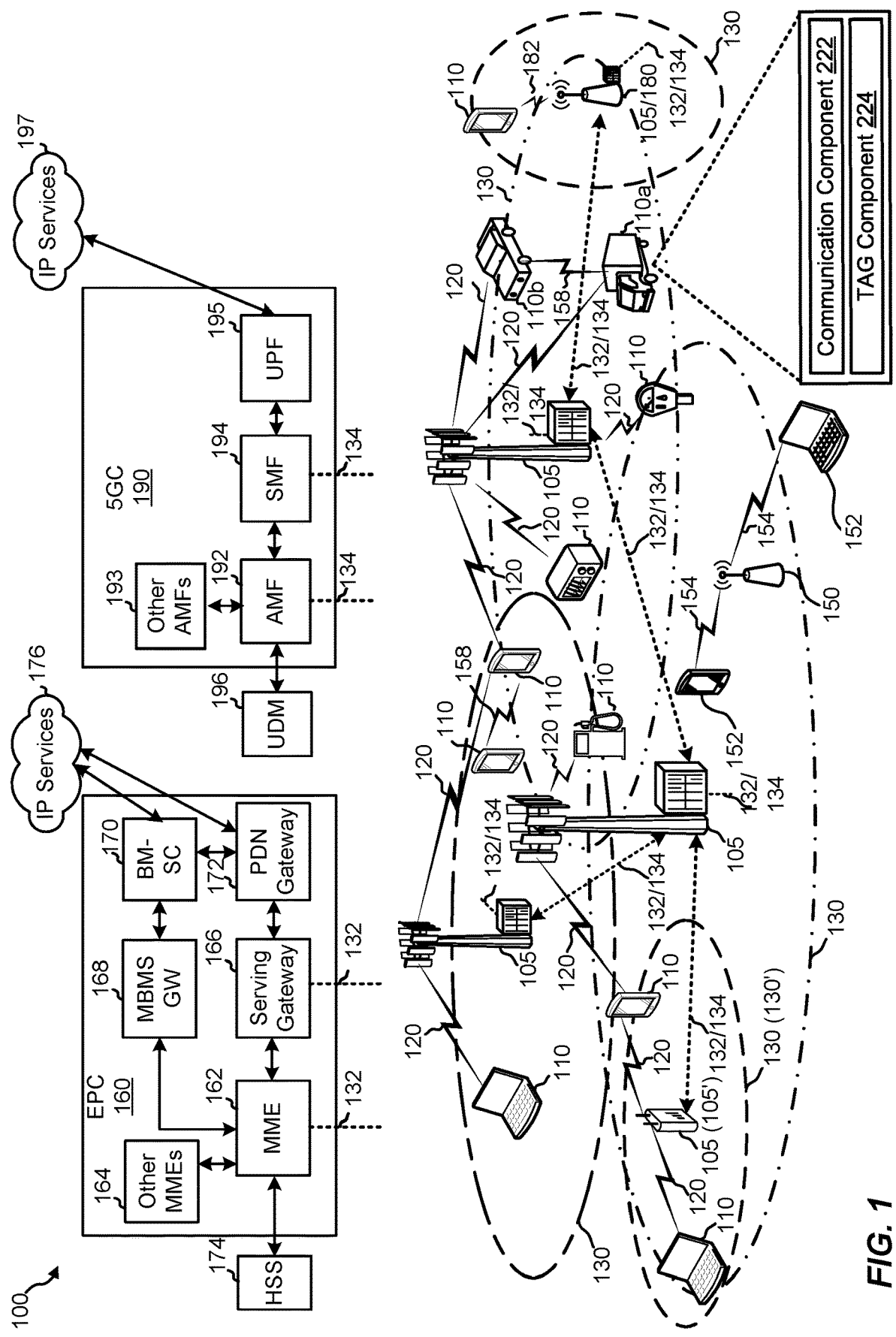
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

During sidelink (SL) communications, for example, a user equipment (UE) may communicate with a base station (BS) via an Interface Uu (Uu) while communicating with another UE via a sidelink. The UE may simultaneously communicate with one or more BSs and/or one or more UEs. The distances between the UEs and the BSs may be different, and may follow different timing advance (TA) rules. This may cause difficulties for the UE in maintaining proper timing synchronizations between the Uu interface and the SL interface, and/or in other communications with the BS. Therefore, improvements in wireless communications may be desired.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some instances, the BS may be unaware of the SL communications and attempt to allocate one or more TA groups the UE reserves for SL communications. The present disclosure may provide one or more solutions that address one or more of these issues.

For example, in an aspect of the present disclosure, the UE may report separate numbers of TAGs. For example, the UE reports a first number indicating the number of TAGs supported for Uu and a second number indicating the number of TAGs supported for SL. Reporting link-specific TAG numbers, namely the number of TAGs available for Uu communication and the number of TAGs available for SL communication, may allow the BS to setup appropriate numbers of uplink communication channels for the UE while the UE engages in SL communication. In other words, the BS, upon receiving the link-specific TAG numbers, may be aware of the number of TAGs the UE has reserved for SL communications. As a result, the BS may schedule Uu communication based on the number of TAGs available for Uu communication. The present disclosure avoids the BS from initiating new communication channels that are beyond the capability of the UE.

Additional aspects are also described that may improve timing synchronization. For example, the UE may simultaneously engage in Uu communications and SL communications without the BS allocating uplink communication channels beyond the capability of the UE.

FIG. 1 is a diagram illustrating an example of a wireless communication network 100. The wireless communications system (also referred to as a wireless wide area network (WWAN)) includes at least one base station (BS) 105, UEs 110, 110a, and 110b (generally referred to as "UE 110" herein), an Evolved Packet Core (EPC) 160, and a 5G Core (5GC) 190. The UE 110 may include a communication component 222 that transmits and receives data to/from other UEs 110 and BS 105. Additionally, the UE 110 may include a TAG component 224 that manages TAGs among Uu communication links and/or SL communication links, as described in more detail below with respect to FIGS. 2-9.

In some implementations, the BS 105 may include macro cells (high power cellular base station) and/or small cells (low power cellular base station). The macro cells include base stations. The small cells include femtocells, picocells, and microcells. A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 132, 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The communication links 120 may be utilized for Uu communications. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may be used in sidelink communication without involvement from the BS 105. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
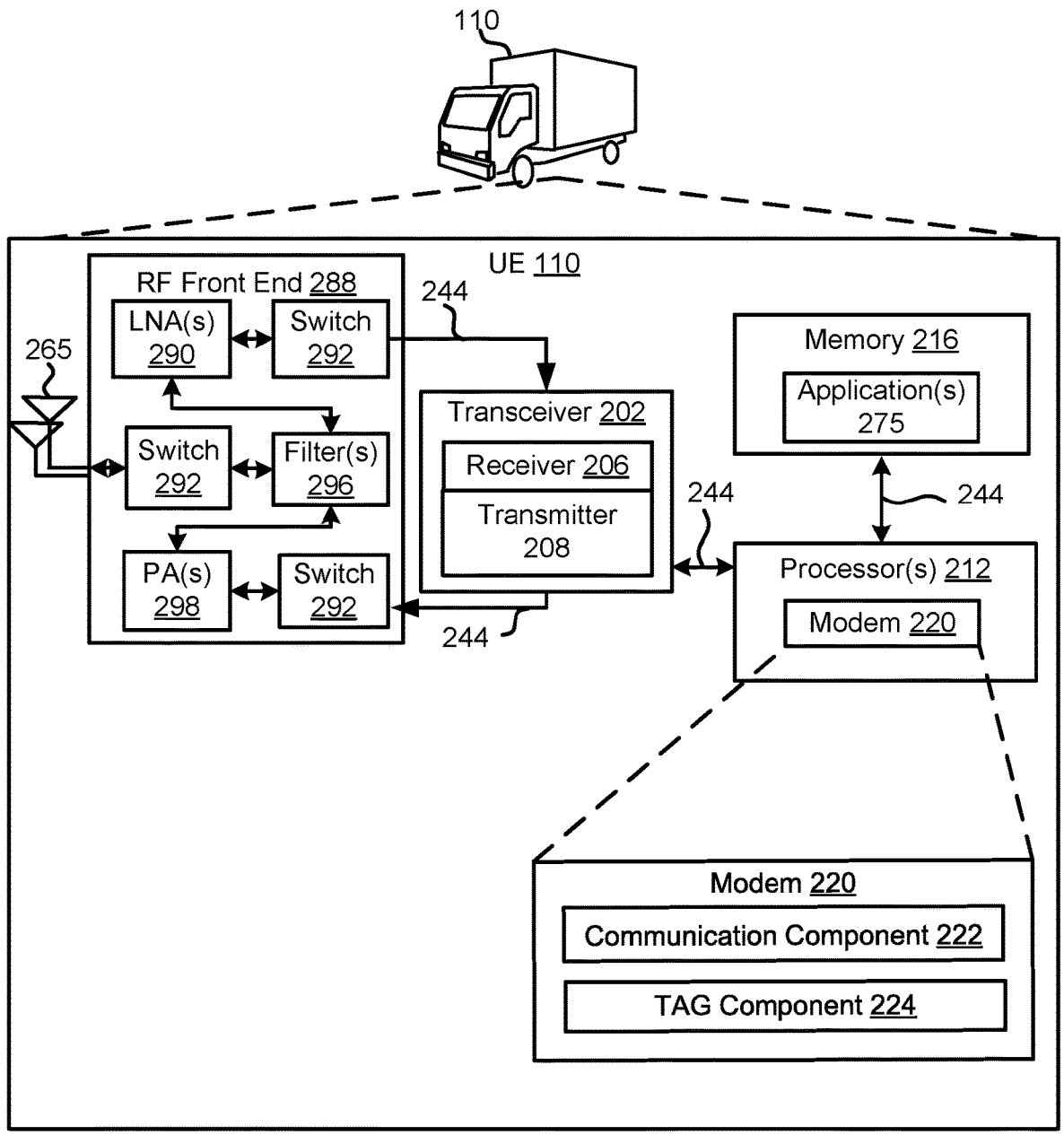
FIG. 2 is a schematic diagram of an example of a user equipment according to aspects of the present disclosure.

Referring to FIG. 2, one example of an implementation of the UE 110 may include a modem 220 having the communication component 222 and the TAG component 224. The communication component 222 and/or the modem 220 of the UE 110 may be configured to communicate with the BS 105 via a cellular network, a Wi-Fi network, or other wireless and wired networks. The TAG component 224 may manage TAGs among Uu communication links and/or SL communication links. The modem 220 may receive and transmit data packets.

In some implementations, the UE 110 may include a variety of components, some of which have already been described above, but including components such as one or more processors 212 and memory 216 and transceiver 202 in communication via one or more buses 244, which may operate in conjunction with the modem 220, the communication component 222 and/or the TAG component 224 to enable one or more of the functions described herein related to communicating with the BS 105 or another UE. Further, the one or more processors 212, modem 220, memory 216, transceiver 202, RF front end 288 and one or more antennas 265, may be configured to support voice and/or data messages (simultaneously or non-simultaneously) in one or more radio access technologies. The one or more antennas 265 may include one or more antennas, antenna elements and/or antenna arrays, and may be controlled for beamforming communications.

In an aspect, the one or more processors 212 may include the modem 220 that uses one or more modem processors. The various functions related to the communication component 222 and/or the TAG component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the TAG component 224 and the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of its subcomponents, and/or data associated therewith, when UE 110 is operating at least one processor 212 to execute the communication component 222 and/or the TAG component 224 and/or one or more of their subcomponents.

Transceiver 202 may include at least one receiver 206 and at least one transmitter 208. The at least one receiver 206 may include hardware, firmware, and/or software code executable by a processor for receiving data, the code comprising instructions and being stored in a memory (e.g., computer-readable medium). The at least one receiver 206 may be, for example, a RF receiving device. In an aspect, the at least one receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
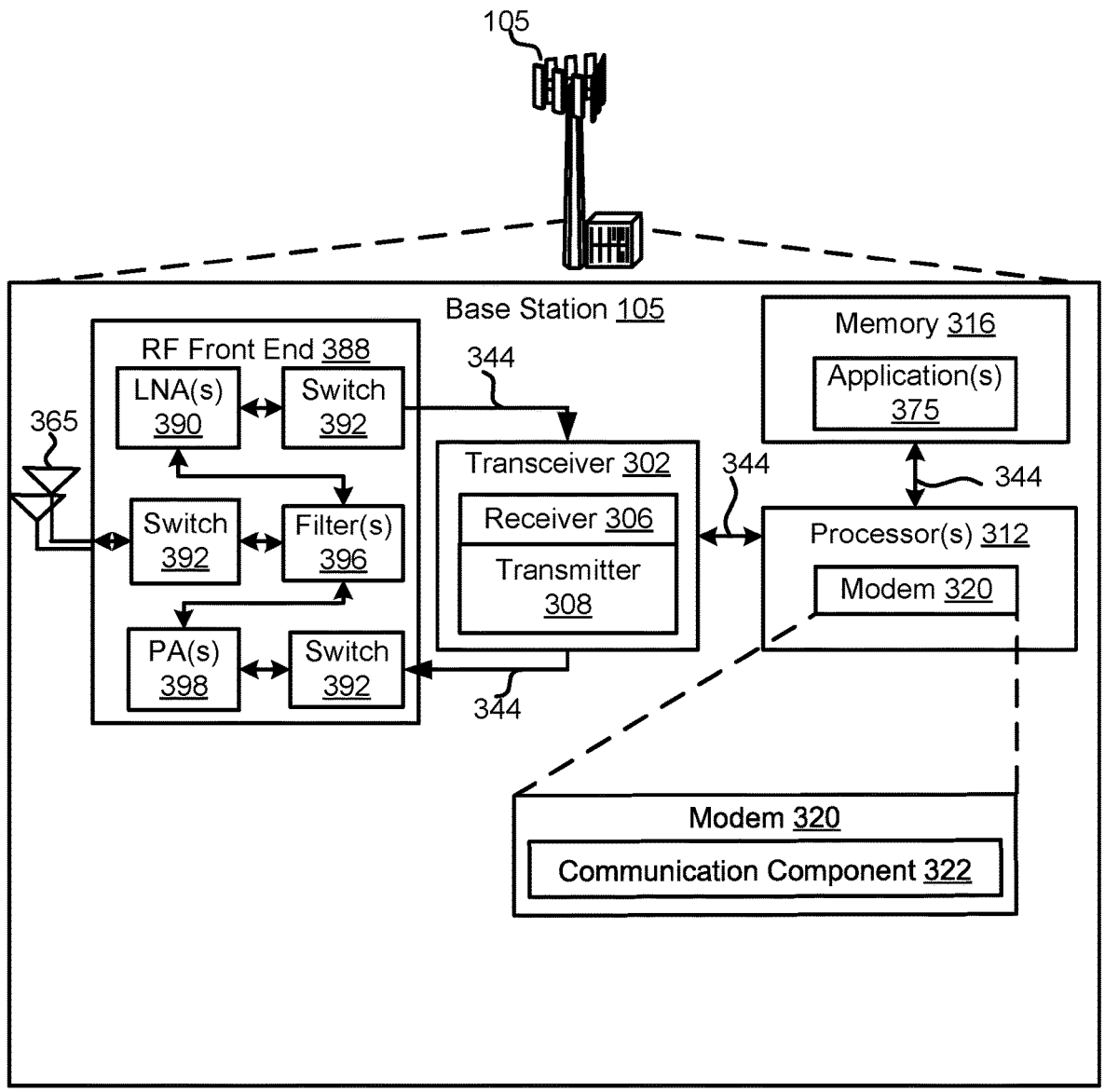
FIG. 3 is a schematic diagram of an example of a base station according to aspects of the present disclosure.

Referring to FIG. 3, one example of an implementation of the BS 105 may include a modem 320 with a communication component 322. The communication component 322 and/or the modem 320 the BS 105 may be configured to communicate with the UE 110 via a cellular network, a Wi-Fi network, or other wireless and/or wired networks to perform the functions describe herein relating to the TAG numbers reported by the UE 110.

In some implementations, the BS 105 may include a variety of components, some of which have already been described above, but including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies. The one or more antennas 365 may include one or more antennas, antenna elements and/or antenna arrays, and may be controlled for beamforming communications.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322 and/or one or more subcomponents of the communication component 322 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or one or more of its subcomponents, and/or data associated therewith, when the BS 105 is operating at least one processor 312 to execute the communication component 322 and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The at least one receiver 306 may be, for example, a RF receiving device. In an aspect, the at least one receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
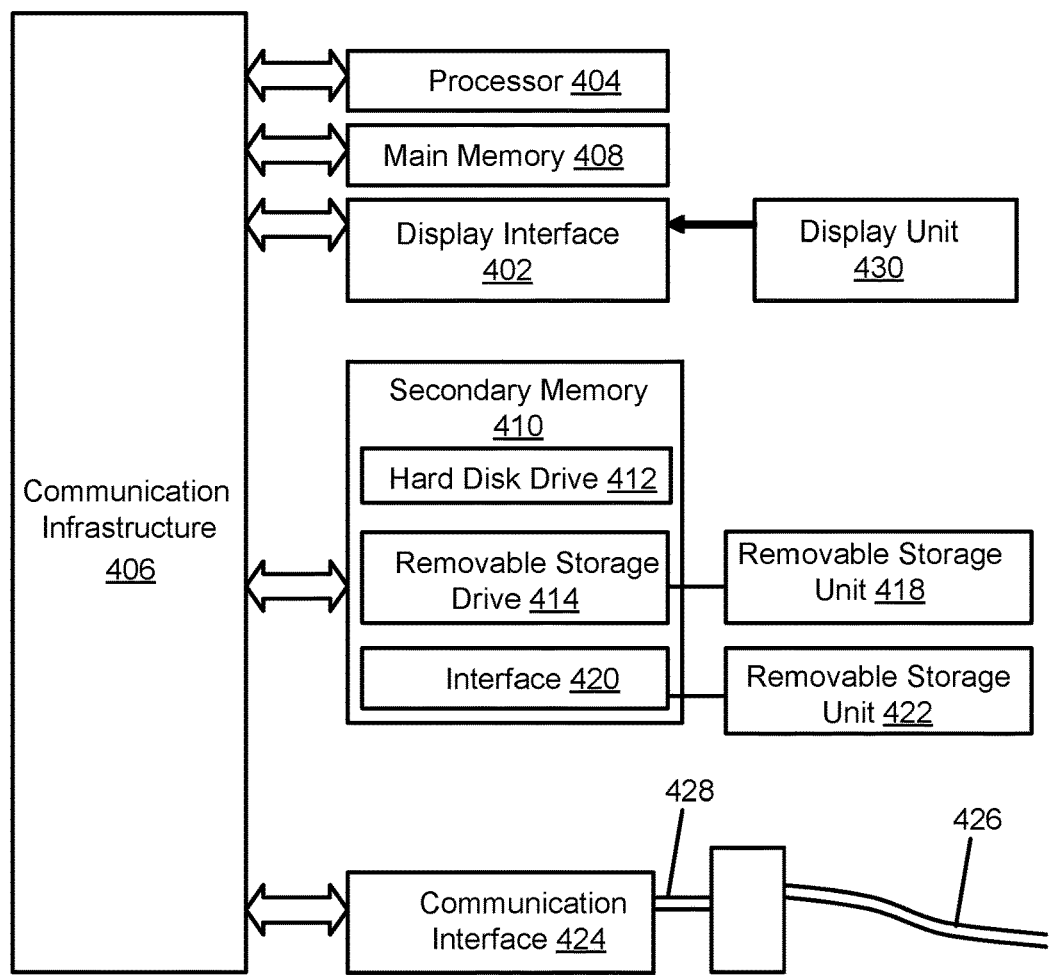
FIG. 4 is a schematic diagram of an example of a computer system for implementing a core network according to aspects of the present disclosure.

Referring now to FIG. 4, the EPC 160 and/or the 5GC 190 may be implemented as one or more core network devices, such as an example of a computer system 400. The computer system 400 may be a hardware system, a virtual system, a cloud-based system, or a combination thereof. The computer system 400 includes one or more processors, such as the processor 404. The processor 404 is communicatively coupled with a communication infrastructure 406 (e.g., a communications bus, cross-over bar, or network).

The computer system 400 may include a display interface 402 that forwards graphics, text, and other data from the communication infrastructure 406 (or from a frame buffer not shown) for display on a display unit 430. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, magnetic tape drive, optical disk drive, universal serial bus (USB) flash drive, etc. The removable storage drive 414 reads from and/or writes to a first removable storage unit 418 in a well-known manner. The first removable storage unit 418 represents a floppy disk, magnetic tape, optical disk, USB flash drive etc., which is read by and written to removable storage drive 414. As will be appreciated, the first removable storage unit 418 includes a computer usable storage medium having stored therein computer software and/or data.

Alternative aspects of the present disclosure may include secondary memory 410 and may include other similar devices for allowing computer programs or other instructions to be loaded into computer system 400. Such devices may include, for example, a second removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units (not shown) and interfaces 420, which allow software and data to be transferred from the second removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using one or more of a wire or cable, fiber optics, telephone line, cellular link, RF link and/or other communications channels. In this document, the terms "computer program medium" and "computer usable medium" are used to refer generally to media such as the first removable storage unit 418, a hard disk installed in hard disk drive 412, and signals 428. These computer program products provide software to the computer system 400. Aspects of the present disclosure are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features in accordance with aspects of the present disclosure, as discussed herein. In particular, the computer programs, when executed, enable the processor 404 to perform the features in accordance with aspects of the present disclosure. Accordingly, such computer programs represent controllers of the computer system 400.

In an aspect of the present disclosure where the method is implemented using software, the software may be stored in a computer program product and loaded into computer system 400 using removable storage drive 414, hard drive 412, or communications interface 420. The control logic (software), when executed by the processor 404, causes the processor 404 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 5:
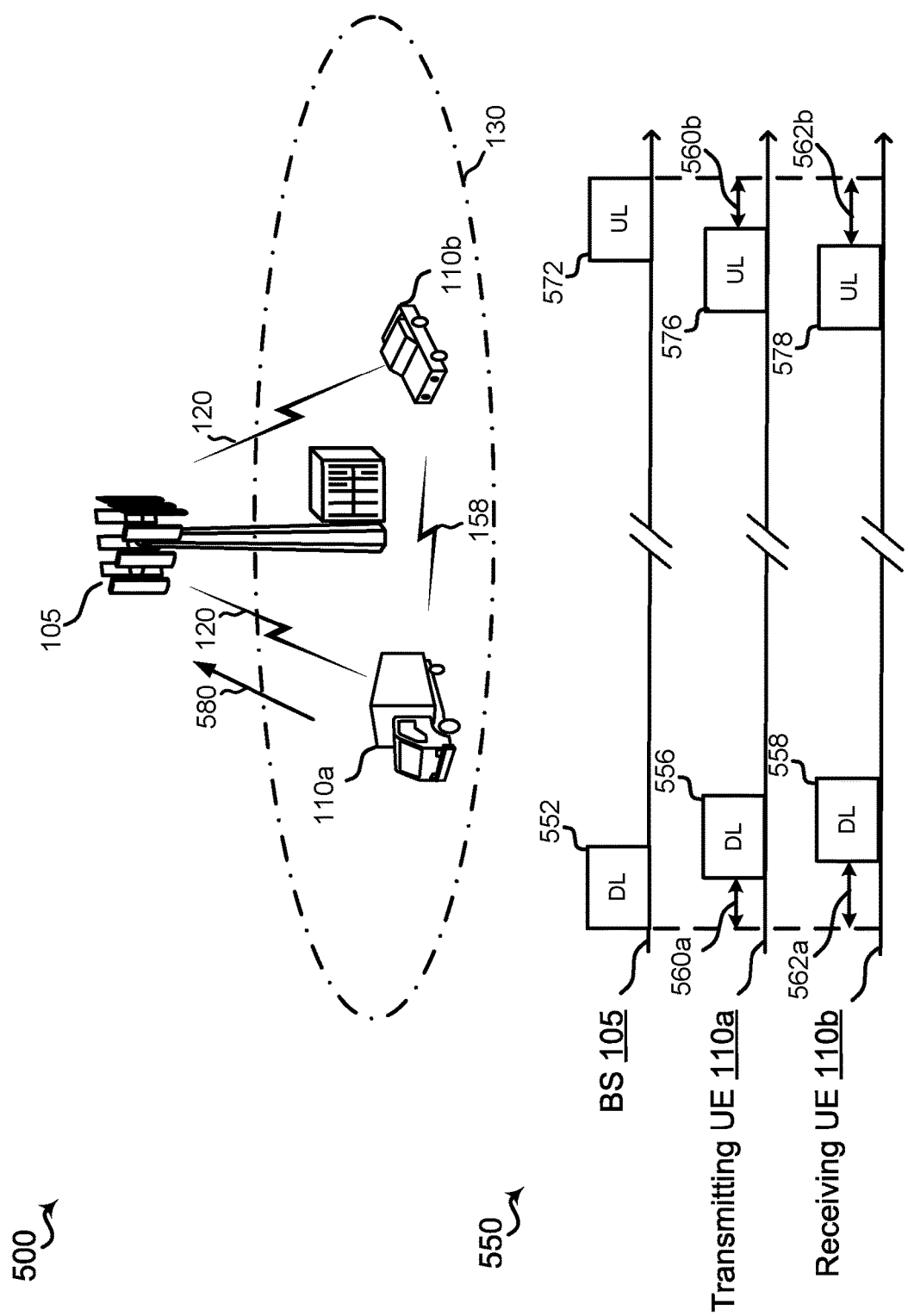
FIG. 5 is a first example of an environment for managing one or more Uu communication links and/or one or more SL communication links according to aspects of the present disclosure.

Turning now to FIG. 5, a first example of an environment 500 for managing one or more Uu communication links and/or one or more SL communication links may include a BS 105, a first UE 110a, and a second UE 110b. In the environment 500, the first UE 110a and the second UE 110b may be in a cell including a coverage area 130 of the BS 105 of a PLMN. The first UE 110a may transmit SL data to the second UE 110b via a D2D communication link 158. The first UE 110a and/or the second UE 110b may transmit and/or receive Uu data to/from the BS 105 via the communication link 120.

Still referring to FIG. 5, in certain implementation, a first example of a timing diagram 550 of communications over time between the BS 105, the first UE 110a, and/or the second UE 110b includes a DL window 552 and a UL window 572. The horizontal lines indicate time. The BS 105 may transmit DL data to the first UE 110a and/or the second UE 110b during the DL window 552 and receive UL data from the first UE 110a and/or the second UE 110b during the UL window 572. When the BS 105 transmits the DL data to the first UE 110a during the DL window 552, the first UE 110a may receive the DL data during a DL window 556, which has a propagation delay 560a after the DL window 552. The propagation delay 560a may include a time for the signal carrying the DL data to travel from the BS 105 to the first UE 110a. The propagation delay 560a may optionally include electronic switching time. The electronic switching time may be the amount of time for the hardware in the BS 105, and/or the first UE 110a to perform functions such as transmitting and/or receiving signals. When the BS 105 transmits the DL data to the second UE 110b during the DL window 552, the second UE 110b may receive the DL data during a DL window 558, which has a propagation delay 562a after the DL window 552. The propagation delay 562a may include a time for the signal carrying the DL data to travel from the BS 105 to the second UE 110b. The propagation delay 562a may optionally include electronic switching time.

In one aspect of the present disclosure, an UL window 576 of the first UE 110a may be set at a timing advance value 560b ahead of the UL window 572. The timing advance value 560b may be proportional to the propagation delay 560a. An UL window 578 of the second UE 110b may be set at a timing advance value 562b ahead of the UL window 572. The timing advance value 562b may be proportional to the propagation delay 562a. The use of the respective timing advance values may synchronize the uplink transmissions at the UEs 110a and 110b with the uplink reception at the BS 105. Specifically, for example, if the first UE 110a is aware of the uplink reception timing (e.g., the UL window 572), the first UE 110a may "shift" the uplink transmission (e.g., the UL window 576) ahead by the value of the timing advance value 560b. The same principle applies to the shifting of the uplink transmission (e.g., the UL window 578) performed by UE 110b based on the timing advance value 562b. As a result, the uplink transmission by the first UE 110a may overlap with the UL window 572 at the BS 105.

In some instances, the first UE 110a and the second UE 110b may have the same timing reference (the DL window 552 or the UL window 572). As such, the first UE 110a and the second UE 110b may be synchronized using the same timing reference. The timing reference of the first UE 110a and the second UE 110b may be the DL timing (based on the DL window 552) or the UL timing (based on the UL window 572), depending on the resource allocation mode. The D2D communication may support multiple resource allocation modes: In Mode 1, a BS may indicate the resources to be used for sidelink transmission, including the resources within a resource pool (RP). In Mode 2, a UE may select an RP and the resources therein from a set of assigned pools.

In some aspects, each UE 110, such as the first UE 110a or the second UE 110b, may concurrently support a certain number of synchronized communication links due to limitation on network standards, hardware, power consumption, and/or regulations. The number indicating the capability of concurrently supporting communication links may be referred to as a timing advance group (TAG) number. The BS 105 may limit the number of uplink communication channels based on the TAG number. For example, if the first UE 110a is capable of supporting five TAGs (i.e., TAG number of five), the BS may establish five or less uplink channels.

In certain aspects, the first UE 110a may report a number of supported TAGs to the BS 105 regardless of whether the supported TAGs are configured for Uu or SL. In one example, a single value of supported TAGs may be reported to the BS 105.

In other implementations, the first UE 110a may report link-specific numbers of TAGs, such as a first number of supported TAGs for Uu and a second number of supported TAGs for SL to the BS 105 (e.g., on a per band basis of a band combination basis). The first UE 110a may transmit a TAG capability report 580 including the first number of supported TAGs for Uu and the second number of supported TAGs for SL to the BS 105.

Figure 6:
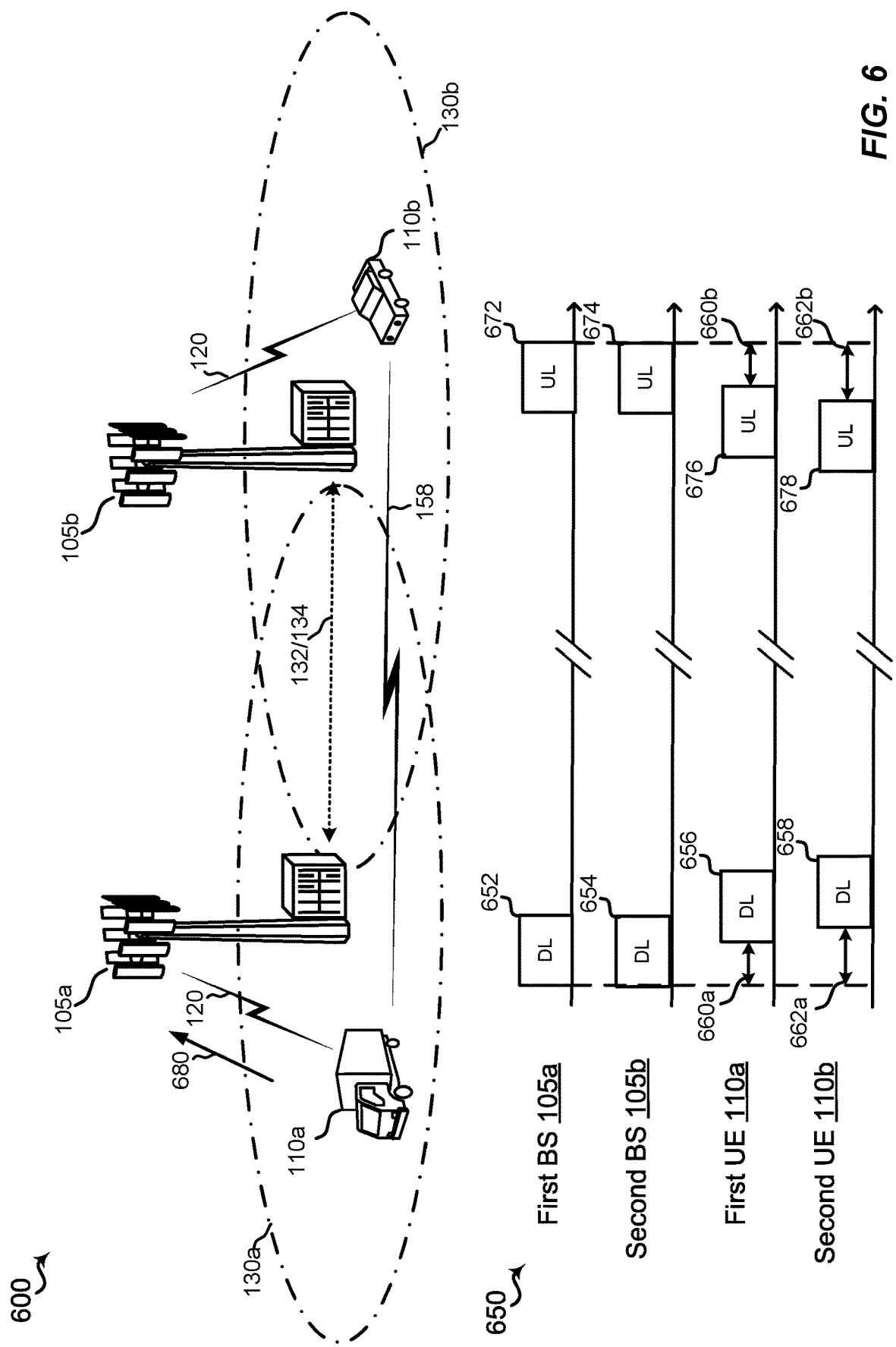
FIG. 6 is a second example of an environment for managing one or more Uu communication links and/or one or more SL communication links according to aspects of the present disclosure.

Turning now to FIG. 6, a second example of an environment 600 for managing one or more Uu communication links and/or one or more SL communication links may include different BSs 105, such as a first BS 105a, a second BS 105b, the first UE 110a, and the second UE 110b. In the environment 600, the first UE 110a may be in a cell including a coverage area 130a of the first BS 105a of a PLMN. The second UE 110b may be in a cell including a coverage area 130b of the second BS 105b of the same PLMN. The first UE 110a may transmit SL data to the second UE 110b via the D2D communication link 158. The first UE 110a and/or the second UE 110b may transmit and/or receive Uu data to/from the first BS 105a and/or the second BS 105b, respectively, via the communication links 120.

Still referring to FIG. 6, in certain implementation, a second example of a timing diagram 650 of communications over time between the BSs 105a and 105b, the first UE 110a, and/or the second UE 110b includes a first DL window 652 and a first UL window 672 associated with the first BS 105a. The timing diagram 650 includes a second DL window 654 and a second UL window 674 associated with the second BS 105b. The first BS 105a may transmit DL data to the first UE 110a during the first DL window 652 and receive UL data from the first UE 110a during the first UL window 672. The second BS 105b may transmit DL data to the second UE 110b during the second DL window 654 and receive UL data from the second UE 110b during the second UL window 674. When the first BS 105a transmits the DL data to the first UE 110a during the first DL window 652, the first UE 110a may receive the DL data during a first UE DL window 656, which has a first propagation delay 660a after the DL window 652. The first propagation delay 660a may include a time for the signal carrying the DL data to travel from the first BS 105a to the first UE 110a. The first propagation delay 660a may optionally include electronic switching time (as discussed above). When the second BS 105b transmits the DL data to the second UE 110b during the second DL window 654, the second UE 110b may receive the DL data during a second UE DL window 658, which has a second propagation delay 662a after the DL window 654. The second propagation delay 662a may include a time for the signal carrying the DL data to travel from the second BS 105b to the second UE 110b. The second propagation delay 662a may optionally include electronic switching time.

In one aspect of the present disclosure, a first UE UL window 676 of the first UE 110a may be set at a first timing advance value 660b ahead of the first UL window 672. The first timing advance value 660b may be proportional to the first propagation delay 660a. A second UE UL window 678 of the second UE 110b may be set at a second timing advance value 662b ahead of the second UL window 674. The second timing advance value 662b may be proportional to the second propagation delay 662a.

In some instances, the first BS 105a and the second BS 105b may be synchronized (as shown in FIG. 6). The first UE 110a and the second UE 110b may have different timing because the distance between the first UE 110a and the first BS 105a may be different than the distance between the receive UE 110b and the second BS 105b. The first UE 110a and the second UE 110b may be synchronized based on the synchronization between the first BS 105a and the second BS 105b. Specifically, one of the UEs 110, such as the first UE 110a, may transmit a TA command in the PSCCH or other SL control channels to the other UE 110, such as the second UE 110b. The TA command may include information requesting the second UE 110b to modify the sidelink TA with reference to at least one of the second DL window 654 (e.g., Mode 2 resource allocation for SL) or the second UL window 674 (e.g., Mode 1 resource allocation for SL), and at least one of the first TA value 662b or the second TA value 662b. In some aspects, the first UE 110a and/or the second UE 110b may support more than one TAG.

In other implementations, the first BS 105a and the second BS 105b may not be synchronized (not shown). One of the UEs 110, such as the first UE 110a, may become the source of synchronization during SL communication by transmitting one or more primary synchronization signals (PSS) and/or secondary synchronization signals (SSS) to the other UE 110, such as the second UE 110b. The first UE 110a (i.e., the source of synchronization during SL communication) may utilize the DL timing (e.g., the first DL window 652) and/or the UL timing (e.g., the first UL window 672) for synchronization of the SL communication. In one instance, either the first UE 110a or the second UE 110b may be the source of synchronization because they are in the coverage areas 130 of the PLMN. In other instance, only the UE 110 in the coverage area 130 may be the source of synchronization for the other UE 110 not in the coverage area 130. In a non-limiting example, the UE 110 acting as the source of synchronization may support two or more TAGs.

In certain aspects, the first UE 110a may report link-specific TAG numbers, such as a number of supported TAGs to the first BS 105a regardless of whether the supported TAGs are configured for Uu or SL. In one example, a single value of supported TAGs may be reported to the first BS 105a.

In other implementations, the first UE 110a may report link-specific TAG numbers, such as a first number of supported TAGs for Uu and a second number of supported TAGs for SL to the first BS 105a (e.g., on a per band basis of a band combination basis). The first UE 110a may transmit a TAG capability report 680 including the first number of supported TAGs for Uu and the second number of supported TAGs for SL to the BS 105.

Figure 7:
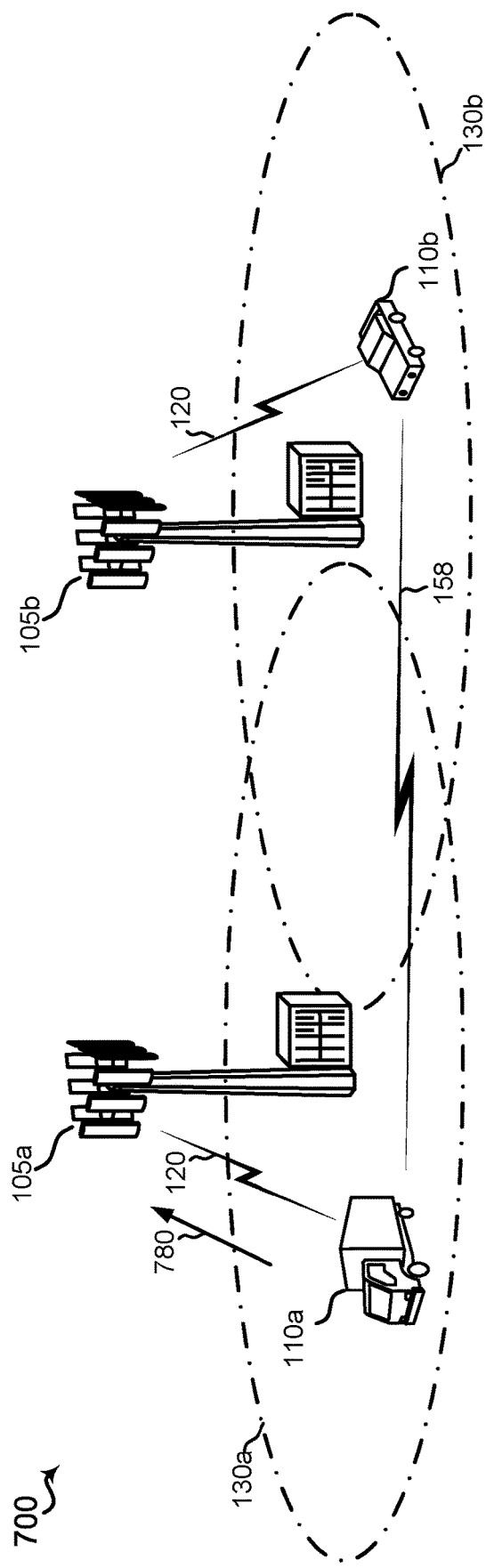
FIG. 7 is a third example of an environment for managing one or more Uu communication links and/or one or more SL communication links according to aspects of the present disclosure.
Figure 7:
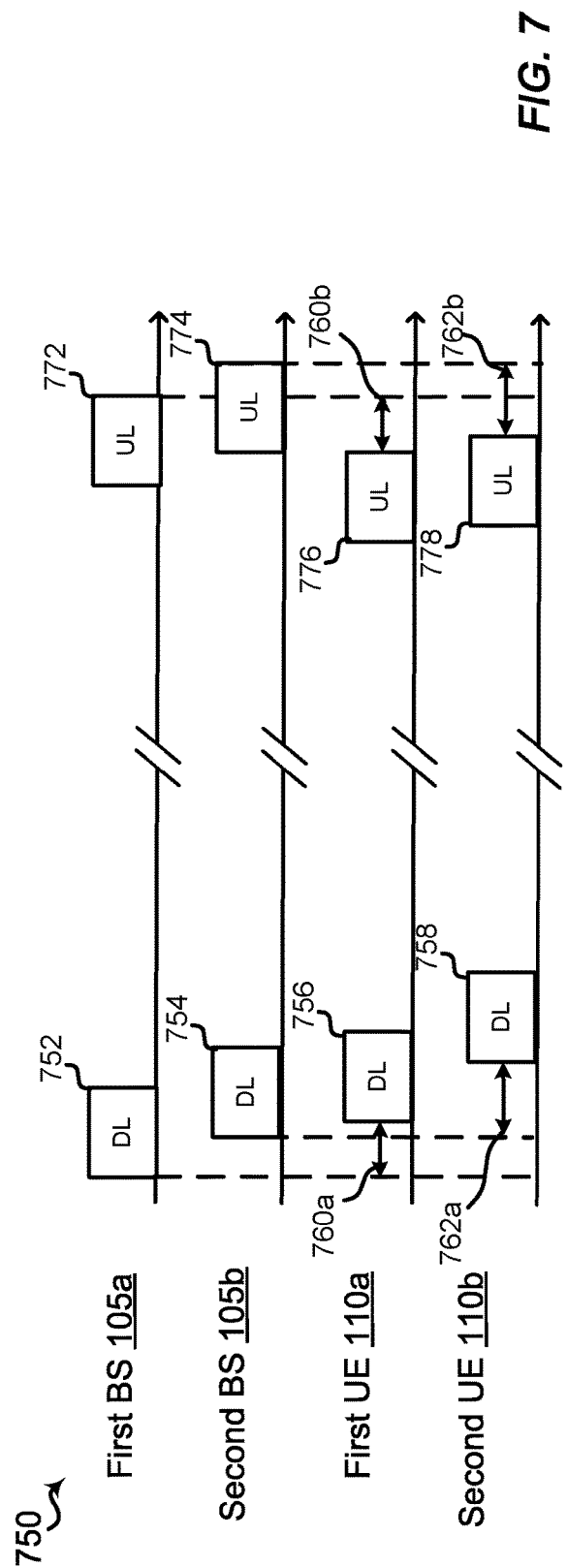

Turning now to FIG. 7, a third example of an environment 700 for managing one or more Uu communication links and/or one or more SL communication links may include different BSs 105, such as the first BS 105a, the second BS 105b, the first UE 110a, and the second UE 110b. In the environment 700, the first UE 110a may be in a cell including a coverage area 130a of the first BS 105a of a first PLMN. The second UE 110b may be in a cell including a coverage area 130b of the second BS 105b of a second PLMN. In one aspect of the present disclosure, the first PLMN may be the service provider for the first UE 110a. The first UE 110a may transmit SL data to the second UE 110b via the D2D communication link 158. The first UE 110a and/or the second UE 110b may transmit and/or receive Uu data to/from the first BS 105a and/or the second BS 105b, respectively, via the communication links 120.

Still referring to FIG. 7, in certain implementation, a third example of a timing diagram 750 of communications over time between the BSs 105a and 105b, the first UE 110a, and/or the second UE 110b includes a first DL window 752 and a first UL window 772 associated with the first BS 105a of the first PLMN. The timing diagram 750 includes a second DL window 754 and a second UL window 774 associated with the second BS 105b of the second PLMN. The first BS 105a may transmit DL data to the first UE 110a during the first DL window 752 and receive UL data from the first UE 110a during the first UL window 772. The second BS 105b may transmit DL data to the second UE 110b during the second DL window 754 and receive UL data from the second UE 110b during the second UL window 774. When the first BS 105a transmits the DL data to the first UE 110a during the first DL window 752, the first UE 110a may receive the DL data during a first UE DL window 756, which has a first propagation delay 760a after the DL window 752. The first propagation delay 760a may include a time for the signal carrying the DL data to travel from the first BS 105a to the first UE 110a. The first propagation delay 760a may optionally include electronic switching time. When the second BS 105b transmits the DL data to the second UE 110b during the second DL window 754, the second UE 110b may receive the DL data during a second UE DL window 758, which has a second propagation delay 762a after the DL window 754. The second propagation delay 762a may include a time for the signal carrying the DL data to travel from the second BS 105b to the second UE 110b. The second propagation delay 762a may optionally include electronic switching time.

In one aspect of the present disclosure, a first UE UL window 776 of the first UE 110a may be set at a first TA value 760b ahead of the first UL window 772. The first timing advance value 760b may be proportional to the first propagation delay 760a. A second UE UL window 778 of the second UE 110b may be set at a second timing advance value 762b ahead of the second UL window 774. The second TA value 762b may be proportional to the second propagation delay 762a.

In some instances, the first BS 105a and the second BS 105b may not be synchronized (as shown in FIG. 7) because the first BS 105a is in the first PLMN and the second BS 105b is in the second PLMN. The first UE 110a and the second UE 110b may have different timing because the distance between the first UE 110a and the first BS 105a may be different than the distance between the receive UE 110b and the second BS 105b, and/or the first BS 105a and the second BS 105b are not be synchronized. One of the UEs 110, such as the first UE 110a, may become the source of synchronization during SL communication by transmitting one or more primary synchronization signals (PSS) and/or secondary synchronization signals (SSS) to the other UE 110, such as the second UE 110b. In other instances, the second UE 110b my become the source of synchronization during SL communication by transmitting one or more primary synchronization signals (PSS) and/or secondary synchronization signals (SSS) to the first UE 110a. In some aspects, both the first UE 110a and the second UE 110b may become the source of synchronization during the transmission of the respective SL communication.

Still referring to FIG. 7, in a different aspect of the present disclosure, the SL communication may not be within the band of the second PLMN. The first PLMN may be the service provider of the first UE 110a and the second PLMN may be the service provider of the second UE 110b. The SL communication may be within the band of the first PLMN or an unlicensed band (e.g., Intelligent Transportation Systems (ITS), Vehicle-to-Everything (V2X)). Therefore, the Uu communication for the second UE 110b may be with the second PLMN, and the SL communication may be with the first PLMN or an unlicensed band.

In another implementation of the present disclosure, the SL communication may not be within the band of the second PLMN. The first PLMN may be the service provider of the first UE 110a and the second PLMN may not be the service provider of the second UE 110b. The SL communication may be within the band of the first PLMN or an unlicensed band (e.g., Intelligent Transportation Systems (ITS), Vehicle-to-Everything (V2X)). Therefore, the Uu communication for the second UE 110b may be with the second PLMN, and the SL communication may be with the first PLMN or an unlicensed band. The second UE 110b may be roaming during Uu communication and SL communication.

In a non-limiting aspect of the present disclosure, the first UE 110a may communicate with the first BS 105a (i.e., Uu communication) on the first PLMN. For the SL communication, different bands may be used for transmission and reception. The first UE 110a may transmit data to the second UE 110b during SL communication on the first PLMN associated with the first BS 105a. The second UE 110b may transmit data to the first UE 110a during SL communication on the second PLMN or an unlicensed band (both not associated with the first BS 105a). In other words, during SL communication, the first BS 105a may be aware of the transmission of data by the first UE 110a but not the reception of data by the first UE 110a.

In certain examples, the first UE 110a may communicate with the first BS 105a (i.e., Uu communication) on the first PLMN. For the SL communication, the first UE 110a may communicate based on bands not associated with the first BS 105a. The first UE 110a may transmit data to the second UE 110b during SL communication on the second PLMN or an unlicensed band (both not associated with the first BS 105a). The second UE 110b may transmit data to the first UE 110a during SL communication on the second PLMN or an unlicensed band (both not associated with the first BS 105a). In other words, the first BS 105a may not be aware of the transmission and/or reception during SL communication.

In certain aspects, the first UE 110a may report link-specific TAG numbers, such as a number of supported TAGs to the first BS 105a regardless of whether the supported TAGs are configured for Uu or SL. In one example, a single value of supported TAGs may be reported to the first BS 105a. In a non-limiting example, the first UE 110a may report a single value of supported TAGs to the first BS 105a if the first BS 105a is aware of the SL communication activities.

In other implementations, the first UE 110a may report link-specific TAG numbers, such as a first number of supported TAGs for Uu and a second number of supported TAGs for SL to the first BS 105a (e.g., on a per band basis of a band combination basis). The first UE 110a may transmit a TAG capability report 780 including the first number of supported TAGs for Uu and the second number of supported TAGs for SL to the BS 105.

In some aspects of the present disclosure, the number of TAGs supported by the UE 110, e.g., the first UE 110a or the second UE 110b, may depend on the resource allocation mode that the UE 110 supports, such as Mode 1 or Mode 2. The number of TAGs supported by the UE 110 may depend on the band or band combination. For example, the Uu and SL communications may both be in Frequency Range 1 (FR1, sub-6 GHz frequency range). In another example, one of the Uu and SL communications may be in Frequency Range 2 (FR2, millimeter wave frequency range) and the other may be in FR1. In a non-limiting example, the SL communication may be in the licensed or unlicensed band.

Figure 8:
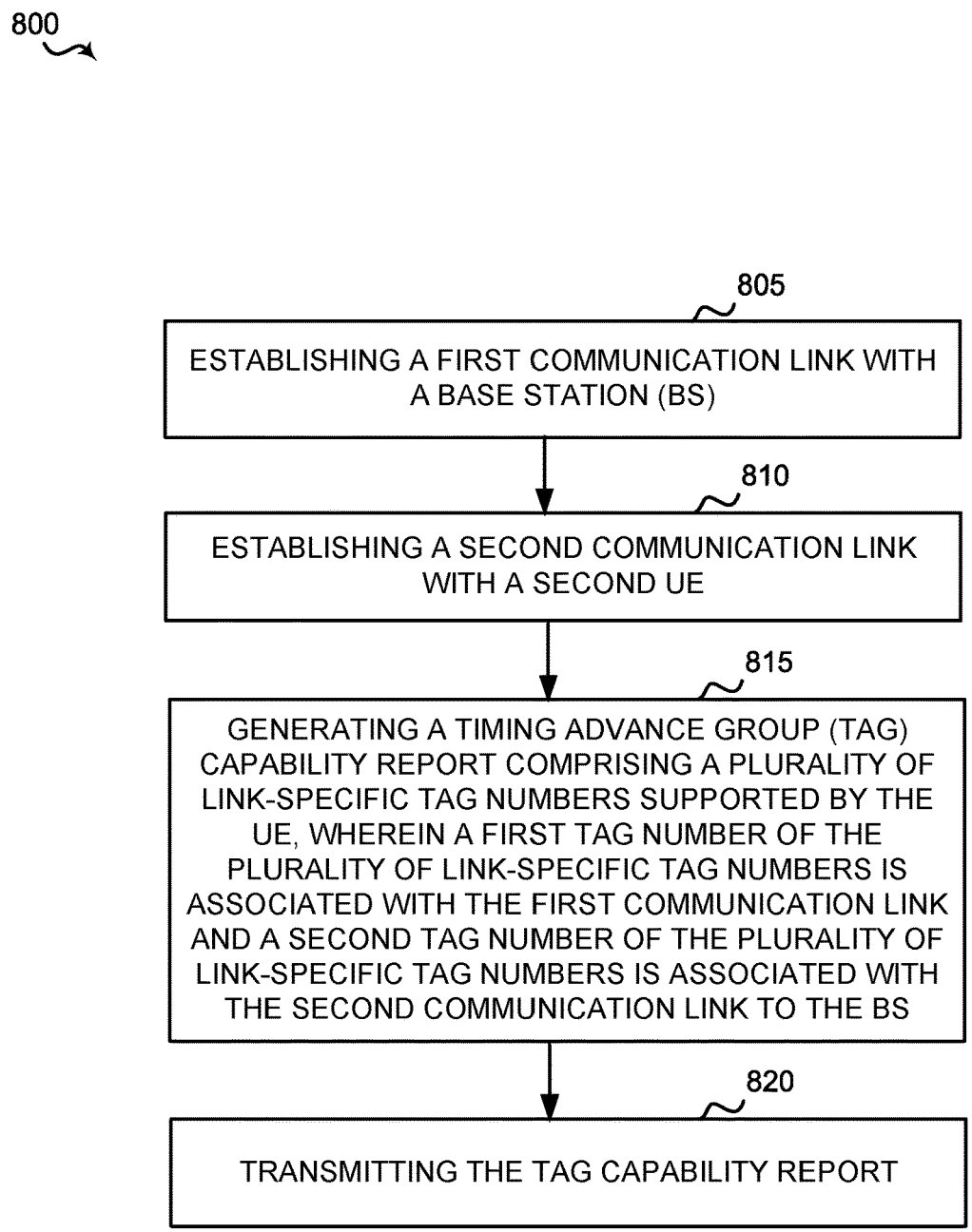
FIG. 8 is a process flow diagram of an example of a method for transmitting a TAG capability report according to aspects of the present disclosure.

Referring to FIG. 8, an example of a method 800 of wireless communications, such as may be associated with managing and/or reporting TAGs, may be performed, for example, by the first UE 110a in the wireless communication network 100.

At block 805, the method 800 may establish, by a first UE, a first communication link with a base station (BS). For example, the communication component 222 of the first UE 110a may establish the communication link 120 (i.e., Uu communication link) with the BS 105. The communication component 222 may transmit and/or receive data, such as one or more random access messages, to establish the communication link 120. In some non-limiting examples, the communication component 222 of the modem 220 and/or the processor 212 may generate one or more random access messages. The communication component 222 may send the digital data in the one or more random access messages to the transceiver 202 or the transmitter 208. The transceiver 202 and/or the transmitter 208 may convert the digital data into electrical signal, and send to the RF front end 288. The RF front end 288 and its subcomponents, such as the PAs 298 and the filters 296, may filter, amplify, and/or convert the electrical signals into electro-magnetic signals. The one or more antennas 265 may transmit electro-magnetic signals containing the digital data in the one or more random access messages. In some instances, the one or more antennas 265 may receive electro-magnetic signals containing the digital data in the one or more random access messages. The RF front end 288 and its subcomponents, such as the LNAs 290 and the filters 296, may filter, amplify, and/or convert the received electro-magnetic signals into electrical signals. The transceiver 202 and/or the receiver 206 may receive the electrical signals from the RF front end 288 and convert the electrical signals into digital data. The communication component 222 may receive the digital data including one or more random access messages from the transceiver 202 and/or the receiver 206.

In certain implementations, the processor 212, the modem 220, the communication component 222, the transceiver 202, the receiver 206, the transmitter 208, the RF front end 288, and/or the subcomponents of the RF front end 288 may be configured to and/or may define means for establishing a first communication link with a base station (BS).

At block 810, the method 800 may establish a second communication link with a second UE. For example, the communication component 222 of the first UE 110a may establish the D2D communication link 158 (i.e., SL communication link) with the second UE 110b. The communication component 222 may transmit and/or receive data, such as one or more random access messages, to establish the communication link 120. In some non-limiting examples, the communication component 222 of the modem 220 and/or the processor 212 may generate one or more random access messages. The communication component 222 may send the digital data in the one or more random access messages to the transceiver 202 or the transmitter 208. The transceiver 202 and/or the transmitter 208 may convert the digital data into electrical signal, and send to the RF front end 288. The RF front end 288 and its subcomponents, such as the PAs 298 and the filters 296, may filter, amplify, and/or convert the electrical signals into electro-magnetic signals. The one or more antennas 265 may transmit electro-magnetic signals containing the digital data in the one or more random access messages. In some instances, the one or more antennas 265 may receive electro-magnetic signals containing the digital data in the one or more random access messages. The RF front end 288 and its subcomponents, such as the LNAs 290 and the filters 296, may filter, amplify, and/or convert the received electro-magnetic signals into electrical signals. The transceiver 202 and/or the receiver 206 may receive the electrical signals from the RF front end 288 and convert the electrical signals into digital data. The communication component 222 may receive the digital data including one or more random access messages from the transceiver 202 and/or the receiver 206.

In certain implementations, the processor 212, the modem 220, the communication component 222, the transceiver 202, the receiver 206, the transmitter 208, the RF front end 288, and/or the subcomponents of the RF front end 288 may be configured to and/or may define means for establishing a second communication link with a second UE.

At block 815, the method 800 may generate a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS. For example, the TAG component 224 of the first UE 110*a* may generate the TAG capability report 580. The TAG capability report 580 may be generated based on the physical resources of the first UE 110*a*, such as processing capability, power usage, antenna configuration, memory availability, etc. The TAG capability report 580 may include the first number of supported TAGs for Uu and the second number of supported TAGs for SL.

In certain implementations, the processor 212, the modem 220, and/or the TAG component 224 may be configured to and/or may define means for generating a timing advance group (TAG) capability report comprising a plurality of link-specific TAG numbers, wherein a first TAG number of the plurality of link-specific TAG numbers is associated with the first communication link and a second TAG number of the plurality of link-specific TAG numbers is associated with the second communication link to the BS.

At block 820, the method 800 may transmit the TAG capability report to the BS. For example, the communication component 222 of the first UE 110*a* may transmit the TAG capability report 580 to the BS 105. In a non-limiting implementation, the communication component 222 may send the digital data in the TAG capability report 580 to the transceiver 202 or the transmitter 208. The transceiver 202 or the transmitter 208 may convert the digital data into electrical signal, and send to the RF front end 288. The RF front end 288 and its subcomponents, such as the PAs 298 and the filters 296, may filter, amplify, and/or convert the electrical signals into electro-magnetic signals. The one or more antennas 265 may transmit electro-magnetic signals containing the digital data in the TAG capability report 580.

In certain implementations, the processor 212, the modem 220, and/or the TAG component 224 may be configured to and/or may define means for transmitting the TAG capability report to the BS.

In an optional aspect, the method 800 may include receiving timing advance information associated with the first communication link from the BS, wherein the timing advance information includes a timing advance value, and transmitting an uplink information based on the timing advancing value. For example, in an aspect, the UE 110, the processor 212, the modem 220, the communication component 222, the transceiver 202, the receiver 206, the transmitter 208, the RF front end 288, and/or the subcomponents of the RF front end 288 may be configured to and/or may define means for receiving timing advance information associated with the first communication link from the BS, wherein the timing advance information includes a timing advance value, and means for transmitting an uplink information based on the timing advancing value.

In an optional implementation, the method 800 may include transmitting a timing advance command to the second UE to synchronize communication between the first UE and the second UE and transmitting data to the second UE based on the timing advance command. For example, in an aspect, the UE 110, the processor 212, the modem 220, the communication component 222, the transceiver 202, the receiver 206, the transmitter 208, the RF front end 288, and/or the subcomponents of the RF front end 288 may be configured to and/or may define means for transmitting a timing advance command to the second UE to synchronize communication between the first UE and the second UE and means for transmitting data to the second UE based on the timing advance command.

In some optional examples, method 800 may include transmitting timing advance command comprises transmitting the timing advance command on physical sidelink control channel. For example, in an aspect, the UE 110, the processor 212, the modem 220, the communication component 222, the transceiver 202, the receiver 206, the transmitter 208, the RF front end 288, and/or the subcomponents of the RF front end 288 may be configured to and/or may define means for transmitting timing advance command comprises transmitting the timing advance command on physical sidelink control channel.

In some optional implementations, method 800 may include transmitting at least one of a first primary synchronization signal or a first secondary synchronization signal to the second UE and transmitting first data to the second UE via the second communication link. For example, in an aspect, the UE 110, the processor 212, the modem 220, the communication component 222, the transceiver 202, the receiver 206, the transmitter 208, the RF front end 288, and/or the subcomponents of the RF front end 288 may be configured to and/or may define means for transmitting at least one of a first primary synchronization signal or a first secondary synchronization signal to the second UE and means for transmitting first data to the second UE via the second communication link.

In a non-limiting optional example, method 800 may include receiving at least one of a second primary synchronization signal or a second secondary synchronization signal from the second UE and receiving second data from the second UE via the second communication link. For example, in an aspect, the UE 110, the processor 212, the modem 220, the communication component 222, the transceiver 202, the receiver 206, the transmitter 208, the RF front end 288, and/or the subcomponents of the RF front end 288 may be configured to and/or may define means for receiving at least one of a second primary synchronization signal or a second secondary synchronization signal from the second UE and receiving second data from the second UE via the second communication link.

In another optional example, method 800 may include generating the TAG capability report based on a configuration of one or more of the first UE, the second UE, and the BS. Examples of the configuration may include the first communication link being an uplink (Uu) communication link and the second communication link being a sidelink (SL) communication link; the first UE and the second UE in a cell associated with the BS; the first UE in a first cell associated with the BS, the second UE in a second cell associated with a second BS, and wherein the first cell is different than the second cell; the first UE in a first cell associated with the BS, the second UE in a second cell associated with a second BS, and wherein the first cell is associated with a first service provider and the second cell is associated with a second service provider different from the first service provider; the first communication link operating in a first band associated with a first service provider of the BS and the second communication link operating in a second band associated with an unlicensed band or a roaming service provider; the first communication link operating in a first band associated with a first roaming service provider of the BS and the second communication link operating in a second band associated with an unlicensed band or a second roaming service provider.

Figure 9:
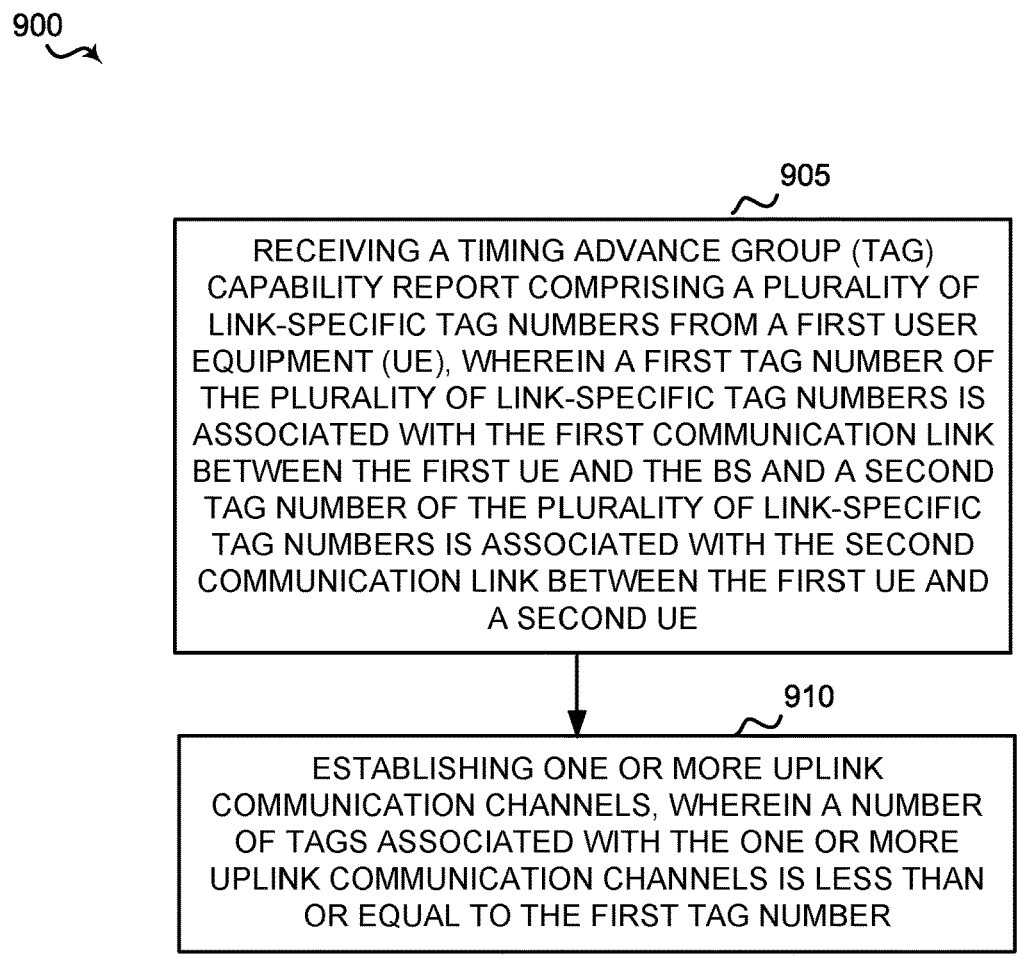
FIG. 9 is a process flow diagram of an example of a method for receiving a TAG capability report according to aspects of the present disclosure.

Turning now to FIG. 9, a method 900 of wireless communication, such as relating to receiving a TAG capability report may be performed by the BS 105 in the wireless communication network 100.

At block 905, the method 900 may receive a timing advance group (TAG) capability report comprising a plurality of link-specific TAG numbers supported by the UE from a first user equipment (UE), wherein a first TAG number (e.g., 2) of the plurality of link-specific TAG numbers is associated with the first communication link between the first UE and the BS and a second TAG number (e.g., 1) of the plurality of link-specific TAG numbers is associated with the second communication link between the first UE and a second UE. For example, the communication component 322 of the BS 105 may receive the TAG capability report 580 from the first UE 110a. In some non-limiting examples, the one or more antennas 365 may receive electro-magnetic signals containing the TAG capability report 580. The RF front end 388 and its subcomponents, such as the LNAs 390 and the filters 396, may filter, amplify, and/or convert the received electro-magnetic signals into electrical signals. The transceiver 302 and/or the receiver 306 may receive the electrical signals from the RF front end 388 and convert the electrical signals into digital data. The communication component 322 may receive the digital data including the TAG capability report 580 from the transceiver 302 and/or the receiver 306.

In certain implementations, the processor 312, the modem 320, the communication component 322, the transceiver 302, the receiver 306, the transmitter 308, the RF front end 388, and/or the subcomponents of the RF front end 388 may be configured to and/or may define means for receiving a timing advance group (TAG) capability report comprising a plurality of link-specific TAG numbers from a first user equipment (UE), wherein a first TAG number of the plurality of link-specific TAG numbers is associated with the first communication link between the first UE and the BS and a second TAG number of the plurality of link-specific TAG numbers is associated with the second communication link between the first UE and a second UE.

At block 910, the method 900 may establish one or more uplink communication channels, wherein a number of TAGs associated with the one or more uplink communication channels is less than or equal to the first TAG number. For example, the communication component 322 may establish up to 2 uplink communication channels. The communication component 322 may transmit and/or receive data to establish the communication channels. In some non-limiting examples, the communication component 322 may send the digital data in the one or more random access messages to the transceiver 302 or the transmitter 308. The transceiver 302 and/or the transmitter 308 may convert the digital data into electrical signal, and send to the RF front end 388. The RF front end 388 and its subcomponents, such as the PAs 398 and the filters 396, may filter, amplify, and/or convert the electrical signals into electro-magnetic signals. The one or more antennas 365 may transmit electro-magnetic signals containing the digital data. In some instances, the one or more antennas 365 may receive electro-magnetic signals containing the digital data. The RF front end 388 and its subcomponents, such as the LNAs 390 and the filters 396, may filter, amplify, and/or convert the received electro-magnetic signals into electrical signals. The transceiver 302 and/or the receiver 306 may receive the electrical signals from the RF front end 388 and convert the electrical signals into digital data. The communication component 322 may receive the digital data from the transceiver 302 and/or the receiver 306.

In certain implementations, the processor 312, the modem 320, the communication component 322, the transceiver 302, the receiver 306, the transmitter 308, the RF front end 388, and/or the subcomponents of the RF front end 388 may be configured to and/or may define means for establishing one or more uplink communication channels, wherein a number of the one or more uplink communication channels is less than or equal to the first TAG number.

ADDITIONAL IMPLEMENTATIONS

Aspects of the present disclosure include a method of wireless communication by a transmitting user equipment (UE), comprising establishing a first communication link with a base station (BS), establishing a second communication link with a second UE, generating a timing advance group (TAG) capability report comprising a plurality of link-specific TAG numbers, wherein a first TAG number of the plurality of link-specific TAG numbers is associated with the first communication link and a second TAG number of the plurality of link-specific TAG numbers is associated with the second communication link to the BS, and transmitting the TAG capability report to the BS.

Any of the method above, further comprising receiving timing advance information associated with the first communication link from the BS, wherein the timing advance information includes a timing advance value and transmitting an uplink information based on the timing advancing value Any of the method above, further comprising transmitting a timing advance command to the second UE to synchronize communication between the first UE and the second UE and transmitting data to the second UE based on the timing advance command.

Any of the method above, wherein transmitting timing advance command comprises transmitting the timing advance command on physical sidelink control channel.

Any of the method above further comprising transmitting at least one of a first primary synchronization signal or a first secondary synchronization signal to the second UE and transmitting first data to the second UE via the second communication link.

Any of the method above, further comprising receiving at least one of a second primary synchronization signal or a second secondary synchronization signal from the second UE and receiving second data from the second UE via the second communication link.

Any of the method above, further comprising generating the TAG capability report based on a configuration of one or more of the first UE, the second UE, and the BS.

Any of the method above, wherein the configuration includes the first UE and the second UE in a cell associated with the BS.

Any of the method above, wherein the configuration includes the first communication link being an uplink (Uu) communication link and the second communication link being a sidelink (SL) communication link.

Any of the method above, wherein the configuration includes the first UE and the second UE in a cell associated with the BS.

Any of the method above, wherein the configuration includes the first UE in a first cell associated with the BS, the second UE in a second cell associated with a second BS and wherein the first cell is different than the second cell.

Any of the method above, wherein the configuration includes the first UE in a first cell associated with the BS, the second UE in a second cell associated with a second BS, and wherein the first cell is associated with a first service provider and the second cell is associated with a second service provider different from the first service provider.

Any of the method above, wherein the configuration includes the first communication link operating in a first band associated with a first service provider of the BS and the second communication link operating in a second band associated with an unlicensed band or a roaming service provider.

Any of the method above, further comprising establishing a third communication link with the second UE for transmitting data to the second UE, wherein the configuration includes the first communication link and the third communication link operating in a first band associated with a first service provider of the BS, and the second communication link operating in a second band associated with an unlicensed band or a second roaming service provider.

Aspects of the present disclosure include a first user equipment (UE), comprising a memory comprising instructions, a transceiver, and one or more processors operatively coupled with the memory and the transceiver, the one or more processors configured to execute the instructions to establish a first communication link with a base station (BS), establish a second communication link with a second UE, generate a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS, and transmit, via the transceiver, the TAG capability report to the BS.

Any of the first UE above, wherein the one or more processors are further configured to receive, via the transceiver, timing advance information associated with the first communication link from the BS, wherein the timing advance information includes a timing advance value and transmit, via the transceiver, an uplink information based on the timing advancing value.

Any of the first UE above, wherein the one or more processors are further configured to transmit, via the transceiver, a timing advance command to the second UE to synchronize communication between the first UE and the second UE and transmit, via the transceiver, data to the second UE based on the timing advance command.

Any of the first UE above, wherein transmitting timing advance command comprises transmitting, via the transceiver, the timing advance command on physical sidelink control channel.

Any of the first UE above, wherein the one or more processors are further configured to transmit, via the transceiver, at least one of a first primary synchronization signal or a first secondary synchronization signal to the second UE and transmit, via the transceiver, first data to the second UE via the second communication link.

Any of the first UE above, wherein the one or more processors are further configured to receive, via the transceiver, at least one of a second primary synchronization signal or a second secondary synchronization signal from the second UE and receive, via the transceiver, second data from the second UE via the second communication link.

Any of the first UE above, wherein the one or more processors are further configured to generate the TAG capability report based on a configuration of one or more of the first UE, the second UE, and the BS.

Any of the first UE above, wherein the configuration includes the first communication link being an uplink (Uu) communication link and the second communication link being a sidelink (SL) communication link.

Any of the first UE above, wherein the configuration includes the first UE and the second UE in a cell associated with the BS.

Any of the first UE above, wherein the configuration includes the first UE in a first cell associated with the BS, the second UE in a second cell associated with a second BS, and wherein the first cell is different than the second cell.

Any of the first UE above, wherein the configuration includes the first UE in a first cell associated with the BS, the second UE in a second cell associated with a second BS, and wherein the first cell is associated with a first service provider and the second cell is associated with a second service provider different from the first service provider.

Any of the first UE above, wherein the configuration includes

Any of the first UE above, the first communication link operating in a first band associated with a first service provider of the BS and the second communication link operating in a second band associated with an unlicensed band or a roaming service provider.

Any of the first UE above, wherein the one or more processors are further configured to establish a third communication link with the second UE for transmitting data to the second UE, and wherein the configuration includes the first communication link and the third communication link operating in a first band associated with a first roaming service provider of the BS and the second communication link operating in a second band associated with an unlicensed band or a second roaming service provider.

Aspects of the present disclosure include a non-transitory computer readable medium comprising instructions stored therein that, when executed by one or more processors of a first user equipment (UE), cause the one or more processors to establish a first communication link with a base station (BS), establish a second communication link with a second UE, generate a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS, and transmit the TAG capability report to the BS.

Any of the non-transitory computer readable medium above, further comprising instructions that, when executed by the one or more processors, cause the one or more processors to receive timing advance information associated with the first communication link from the BS, wherein the timing advance information includes a timing advance value and transmit an uplink information based on the timing advancing value.

Any of the non-transitory computer readable medium above, further comprising instructions that, when executed by the one or more processors, cause the one or more processors to transmit a timing advance command to the second UE to synchronize communication between the first UE and the second UE and transmit data to the second UE based on the timing advance command.

Any of the non-transitory computer readable medium above, wherein the instructions for transmitting timing advance command further comprises instructions that, when executed by the one or more processors, cause the one or more processors to transmit the timing advance command on physical sidelink control channel.

Any of the non-transitory computer readable medium above, further comprising instructions that, when executed by the one or more processors, cause the one or more processors to transmit at least one of a first primary synchronization signal or a first secondary synchronization signal to the second UE and transmit first data to the second UE via the second communication link.

Any of the non-transitory computer readable medium above, further comprising instructions that, when executed by the one or more processors, cause the one or more processors to receive at least one of a second primary synchronization signal or a second secondary synchronization signal from the second UE and receive second data from the second UE via the second communication link.

Any of the non-transitory computer readable medium above, further comprising instructions that, when executed by the one or more processors, cause the one or more processors to generate the TAG capability report based on a configuration of one or more of the first UE, the second UE, and the BS.

Any of the non-transitory computer readable medium above, wherein the configuration includes the first communication link being an uplink (Uu) communication link and the second communication link being a sidelink (SL) communication link.

Any of the non-transitory computer readable medium above, wherein the configuration includes the first UE and the second UE in a cell associated with the BS.

Any of the non-transitory computer readable medium above, wherein the configuration includes the first UE in a first cell associated with the BS, the second UE in a second cell associated with a second BS, and wherein the first cell is different than the second cell.

Any of the non-transitory computer readable medium above, wherein the configuration includes the first UE in a first cell associated with the BS, the second UE in a second cell associated with a second BS, and wherein the first cell is associated with a first service provider and the second cell is associated with a second service provider different from the first service provider.

Any of the non-transitory computer readable medium above, wherein the configuration includes the first communication link operating in a first band associated with a first service provider of the BS and the second communication link operating in a second band associated with an unlicensed band or a roaming service provider.

Any of the non-transitory computer readable medium above, further comprising instructions that, when executed by the one or more processors, cause the one or more processors to establish a third communication link with the second UE for transmitting data to the second UE, wherein the configuration includes the first communication link and the third communication link operating in a first band associated with a first roaming service provider of the BS and the second communication link operating in a second band associated with an unlicensed band or a second roaming service provider.

Aspects of the present disclosure include a first user equipment (UE) comprising means for establishing a first communication link with a base station (BS), means for establishing a second communication link with a second UE, means for generating a timing advance group (TAG) capability report comprising a plurality of link-specific TAG numbers supported by the UE, wherein a first TAG number of the plurality of link-specific TAG numbers is associated with the first communication link and a second TAG number of the plurality of link-specific TAG numbers is associated with the second communication link to the BS, and means for transmitting the TAG capability report to the BS.

Any of the first UE above, further comprising means for receiving timing advance information associated with the first communication link from the BS, wherein the timing advance information includes a timing advance value and means for transmitting an uplink information based on the timing advancing value.

Any of the first UE above, further comprising means for transmitting a timing advance command to the second UE to synchronize communication between the first UE and the second UE and means for transmitting data to the second UE based on the timing advance command.

Any of the first UE above, wherein means for transmitting timing advance command comprises means for transmitting the timing advance command on physical sidelink control channel.

Any of the first UE above, further comprising means for transmitting at least one of a first primary synchronization signal or a first secondary synchronization signal to the second UE and means for transmitting first data to the second UE via the second communication link.

Any of the first UE above, further comprising means for receiving at least one of a second primary synchronization signal or a second secondary synchronization signal from the second UE and means for receiving second data from the second UE via the second communication link.

Any of the first UE above, further comprising generating the TAG capability report based on a configuration of one or more of the first UE, the second UE, and the BS.

Any of the first UE above, wherein the configuration includes the first communication link being an uplink (Uu) communication link and the second communication link being a sidelink (SL) communication link.

Any of the first UE above, wherein the configuration includes the first UE and the second UE in a cell associated with the BS.

Any of the first UE above, wherein the configuration includes the first UE in a first cell associated with the BS, the second UE in a second cell associated with a second BS, and wherein the first cell is different than the second cell.

Any of the first UE above, wherein the configuration includes the first UE in a first cell associated with the BS, the second UE in a second cell associated with a second BS, and wherein the first cell is associated with a first service provider and the second cell is associated with a second service provider different from the first service provider.

Any of the first UE above, wherein the configuration includes the first communication link operating in a first band associated with a first service provider of the BS and the second communication link operating in a second band associated with an unlicensed band or a roaming service provider.

Any of the first UE above, further comprising means for establishing a third communication link with the second UE for transmitting data to the second UE, wherein the configuration includes the first communication link operating in a first band associated with a first roaming service provider of the BS and the second communication link operating in a second band associated with an unlicensed band or a second roaming service provider.

Aspects of the present disclosure include a method of wireless communication by a base station (BS), comprising receiving a timing advance group (TAG) capability report comprising a plurality of link-specific TAG numbers from a first user equipment (UE), wherein a first TAG number of the plurality of link-specific TAG numbers is associated with a first communication link between the first UE and the BS and a second TAG number of the plurality of link-specific TAG numbers is associated with a second communication link between the first UE and a second UE and establishing one or more uplink communication channels, wherein a number of TAGs associated with the one or more uplink communication channels is less than or equal to the first TAG number.

Aspects of the present disclosure include a base station (BS), comprising a memory comprising instructions, a transceiver, and one or more processors operatively coupled with the memory and the transceiver, the one or more processors configured to execute the instructions to receive, a transceiver, a timing advance group (TAG) capability report comprising a plurality of link-specific TAG numbers from a first user equipment (UE), wherein a first TAG number of the plurality of link-specific TAG numbers is associated with a first communication link between the first UE and the BS and a second TAG number of the plurality of link-specific TAG numbers is associated with a second communication link between the first UE and a second UE and establish one or more uplink communication channels, wherein a number of TAGs associated with the one or more uplink communication channels is less than or equal to the first TAG number.

Aspects of the present disclosure include a non-transitory computer readable medium comprising instructions stored therein that, when executed by one or more processors of a base station (BS), cause the one or more processors to receive a timing advance group (TAG) capability report comprising a plurality of link-specific TAG numbers from a first user equipment (UE), wherein a first TAG number of the plurality of link-specific TAG numbers is associated with a first communication link between the first UE and the BS and a second TAG number of the plurality of link-specific TAG numbers is associated with a second communication link between the first UE and a second UE and establish one or more uplink communication channels, wherein a number of TAGs associated with the one or more uplink communication channels is less than or equal to the first TAG number.

Aspects of the present disclosure include a base station (BS), comprising means for receiving a timing advance group (TAG) capability report comprising a plurality of link-specific TAG numbers from a first user equipment (UE), wherein a first TAG number of the plurality of link-specific TAG numbers is associated with a first communication link between the first UE and the BS and a second TAG number of the plurality of link-specific TAG numbers is associated with a second communication link between the first UE and a second UE and means for establishing one or more uplink communication channels, wherein a number of TAGs associated with the one or more uplink communication channels is less than or equal to the first TAG number.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a first user equipment (UE), comprising:
    establishing a first communication link between the first UE and a base station (BS);
    establishing a second communication link between the first UE and a second UE;
    generating a timing advance group (TAG) capability report comprising a plurality of link-specific TAG numbers supported by the first UE, wherein a first TAG number of the plurality of link-specific TAG numbers is associated with the first communication link between the first UE and the BS and a second TAG number of the plurality of link-specific TAG numbers is associated with the second communication link between the first UE and the second UE; and
    transmitting the TAG capability report to the BS.

2. The method of claim 1, further comprising:
    receiving timing advance information associated with the first communication link from the BS, wherein the timing advance information includes a timing advance value; and
    transmitting an uplink information based on the timing advancing value.

3. The method of claim 1, further comprising:
    transmitting a timing advance command to the second UE to synchronize communication between the first UE and the second UE; and
    transmitting data to the second UE based on the timing advance command.

4. The method of claim 3, wherein transmitting timing advance command comprises transmitting the timing advance command on physical sidelink control channel.

5. The method of claim 1, further comprising:
    transmitting at least one of a first primary synchronization signal or a first secondary synchronization signal to the second UE via the second communication link; and
    transmitting first data to the second UE via the second communication link.

6. The method of claim 1, further comprising:
    receiving at least one of a second primary synchronization signal or a second secondary synchronization signal from the second UE via the second communication link; and
    receiving second data from the second UE via the second communication link.

7. The method of claim 1, further comprising generating the TAG capability report based on a configuration of one or more of the first UE, the second UE, and the BS.

8. The method of claim 7, wherein the configuration includes the first communication link being an uplink (Uu) communication link and the second communication link being a sidelink (SL) communication link.

9. The method of claim 7, wherein the configuration includes the first UE and the second UE in a cell associated with the BS.

10. The method of claim 7, wherein the configuration includes:
    the first UE in a first cell associated with the BS;
    the second UE in a second cell associated with a second BS; and
    wherein the first cell is different than the second cell.

11. The method of claim 7, wherein the configuration includes:
    the first UE in a first cell associated with the BS;
    the second UE in a second cell associated with a second BS; and
    wherein the first cell is associated with a first service provider and the second cell is associated with a second service provider different from the first service provider.

12. The method of claim 7, wherein the configuration includes:
    the first communication link operating in a first band associated with a first service provider of the BS; and the second communication link operating in a second band associated with an unlicensed band or a roaming service provider.

13. The method of claim 7, further comprising establishing a third communication link with the second UE for transmitting data to the second UE, wherein the configuration includes:
the first communication link and the third communication link operating in a first band associated with a first service provider of the BS; and
the second communication link operating in a second band associated with an unlicensed band or a second roaming service provider.

14. A first user equipment (UE), comprising:
a memory comprising instructions;
a transceiver; and
one or more processors operatively coupled with the memory and the transceiver, the one or more processors configured to execute the instructions to:
establish a first communication link between the first UE and a base station (BS);
establish a second communication link between the first UE and a second UE;
generate a timing advance group (TAG) capability report comprising a plurality of link-specific TAG numbers supported by the UE, wherein a first TAG number of the plurality of link-specific TAG numbers is associated with the first communication link between the first UE and the BS and a second TAG number of the plurality of link-specific TAG numbers is associated with the second communication link between the first UE and the second UE; and
transmit, via the transceiver, the TAG capability report to the BS.

15. The first UE of claim 14, wherein the one or more processors are further configured to:
receive, via the transceiver, timing advance information associated with the first communication link from the BS, wherein the timing advance information includes a timing advance value; and
transmit, via the transceiver, an uplink information based on the timing advancing value.

16. The first UE of claim 14, wherein the one or more processors are further configured to:
transmit, via the transceiver, a timing advance command to the second UE to synchronize communication between the first UE and the second UE; and
transmit, via the transceiver, data to the second UE based on the timing advance command.

17. The first UE of claim 16, wherein transmitting timing advance command comprises transmitting, via the transceiver, the timing advance command on physical sidelink control channel.

18. The first UE of claim 14, wherein the one or more processors are further configured to:
transmit, via the transceiver, at least one of a first primary synchronization signal or a first secondary synchronization signal to the second UE; and
transmit, via the transceiver, first data to the second UE via the second communication link.

19. The first UE of claim 14, wherein the one or more processors are further configured to:
receive, via the transceiver, at least one of a second primary synchronization signal or a second secondary synchronization signal from the second UE; and
receive, via the transceiver, second data from the second UE via the second communication link.

20. The first UE of claim 14, wherein the one or more processors are further configured to generate the TAG capability report based on a configuration of one or more of the first UE, the second UE, and the BS.

21. The first UE of claim 20, wherein the configuration includes the first communication link being an uplink (Uu) communication link and the second communication link being a sidelink (SL) communication link.

22. The first UE of claim 20, wherein the configuration includes the first UE and the second UE in a cell associated with the BS.

23. The first UE of claim 20, wherein the configuration includes:
the first UE in a first cell associated with the BS;
the second UE in a second cell associated with a second BS; and
wherein the first cell is different than the second cell.

24. The first UE of claim 20, wherein the configuration includes:
the first UE in a first cell associated with the BS;
the second UE in a second cell associated with a second BS; and
wherein the first cell is associated with a first service provider and the second cell is associated with a second service provider different from the first service provider.

25. The first UE of claim 20, wherein the configuration includes:
the first communication link operating in a first band associated with a first service provider of the BS; and
the second communication link operating in a second band associated with an unlicensed band or a roaming service provider.

26. The first UE of claim 20, wherein:
the one or more processors are further configured to establish a third communication link with the second UE for transmitting data to the second UE; and
the configuration includes:
the first communication link and the third communication link operating in a first band associated with a first roaming service provider of the BS; and
the second communication link operating in a second band associated with an unlicensed band or a second roaming service provider.

27. A non-transitory computer readable medium comprising instructions stored therein that, when executed by one or more processors of a first user equipment (UE), cause the one or more processors to:
establish a first communication link between the first UE and a base station (BS);
establish a second communication link between the first UE and a second UE;
generate a timing advance group (TAG) capability report comprising a plurality of link-specific TAG numbers supported by the UE, wherein a first TAG number of the plurality of link-specific TAG numbers is associated with the first communication link between the first UE and the BS and a second TAG number of the plurality of link-specific TAG numbers is associated with the second communication link between the first UE and the second UE; and
transmit the TAG capability report to the BS.

28. The non-transitory computer readable medium of claim 27, further comprising instructions that, when executed by the one or more processors, cause the one or more processors to:

receive timing advance information associated with the first communication link from the BS, wherein the timing advance information includes a timing advance value; and transmit an uplink information based on the timing advancing value.

29. The non-transitory computer readable medium of claim 27, further comprising instructions that, when executed by the one or more processors, cause the one or more processors to:

transmit a timing advance command to the second UE to synchronize communication between the first UE and the second UE; and transmit data to the second UE based on the timing advance command.

30. A method of wireless communication by a base station (BS), comprising:

receiving a timing advance group (TAG) capability report comprising a plurality of link-specific TAG numbers from a first user equipment (UE), wherein a first TAG number of the plurality of link-specific TAG numbers is associated with a first communication link between the first UE and the BS and a second TAG number of the plurality of link-specific TAG numbers is associated with a second communication link between the first UE and a second UE; and establishing one or more uplink communication channels, wherein a number of TAGs associated with the one or more uplink communication channels is less than or equal to the first TAG number.

* * * * *